United States Patent
Osieka et al.

[15] 3,644,112
[45] Feb. 22, 1972

[54] METHOD OF CONTROLLING UNWANTED PLANTS

[72] Inventors: Hans Osieka, Ludwigshafen; Adolf Fischer, Mutterstadt; Hans Eugen Kiefer, Wachenheim, all of Germany

[73] Assignee: Badische Anilin- & Soda-Fabrik Aktiengesellschaft, Ludwigshafen Rhine, Germany

[22] Filed: May 20, 1969

[21] Appl. No.: 826,266

[30] Foreign Application Priority Data

May 24, 1968 Germany ..................P 17 68 542.6

[52] U.S. Cl. ..............................................71/90, 260/327 P
[51] Int. Cl. ..........................................................A01n 9/12
[58] Field of Search ......................................................71/90

[56] References Cited

UNITED STATES PATENTS 3,402,241  9/1968  Von Schmeling et al..............424/276
3,454,391  7/1969  Von Schmeling et al...............71/90 X

*Primary Examiner*—James O. Thomas, Jr.
*Attorney*—Johnston, Root, O'Keeffe, Keil, Thompson & Shurtleff

[57] ABSTRACT

New and valuable substituted 1,4-oxathiins having the formula

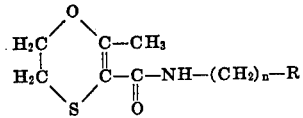

wherein n denotes one of the integers 0 and 1 and R denotes a monocycloaliphatic, bicycloaliphatic, tricycloaliphatic or tetracycloaliphatic radical having in all 5 to 15 carbon atoms, but not a cyclohexyl radical if n is 0, which have a good herbicidal action. The compounds are particularly suitable for controlling unwanted plants without damaging crop plnats. The compounds are also suitable for destroying all plants on a certain area.

3 Claims, No Drawings

METHOD OF CONTROLLING UNWANTED PLANTS

The present invention relates to substituted oxathiins and a process for controlling the growth of unwanted plants with these compounds.

It is known to use propionic acid-3,4-dichloroanilide for controlling weeds; however, its action is not always satisfactory.

An object of the invention is new and valuable substituted 1,4-oxathiin derivatives. A further object of the invention is substituted 1,4-oxathiin derivatives which have a good herbicidal action. Another object of the invention is a process for controlling unwanted plants with substituted 1,4-oxathiin derivatives.

These and other object of the invention are achieved by substituted 1,4-oxathiins having the formula

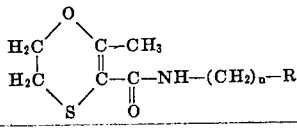

wherein $n$ denotes one of the integers 0 and 1, and R denotes a monocycloaliphatic, bicycloaliphatic, tricycloaliphatic or tetracycloaliphatic radical having in all five to 15 carbons atoms, but not a cyclohexyl radical if $n$ is 0. Examples of such compounds are as follows: the cyclopentyl, cycloheptyl, cyclooctyl, bicyclo-[3,3,0]-octyl, bicyclo-[2,2,1]-heptyl, bicyclo-[2,2,2]-octyl, bicyclo-[3,2,1]-octyl, methylbicyclo-[2,2,1]-heptyl, tricyclo-[5,2,1,0$^{2,6}$]-decyl, tetracyclo-[6,2,1,1$^{3,6}$0$^{2,7}$]-dodecyl, 1,1,3-trimethylcyclohexyl, cyclododecyl, tricyclo-[6,2,1,0$^{2,7}$]-undecyl, methyltetracyclo-[6,2,1,1$^{3,6}$0$^{2,7}$]-dodecyl, bicyclo-[3,2,0]-heptyl, nortricyclyl, bicyclo-[4,3,0]-nonyl and propyltetracyclo-[6,2,1,1$^{3,6}$0$^{2,7}$]-dodecyl radical. The active ingredients may be prepared for example by reaction of 2,3-dihydro-6-methyl-1,4-oxathiin-5-carboxylic acid chloride with a corresponding cycloaliphatic amine, if desired in the presence of a substance having an alkaline reaction. As all the other compounds according to the invention may be prepared analogously, the production of 2,3-dihydro-6-methyl-1,4-oxathiin-5-carboxylic acid-N-bicyclo-[3,3,0]-octylamide is described here in detail:

A solution of 17.9 parts by weight of 2,3-dihydro-6-methyl-1,4-oxathiin-5-carboxylic acid chloride in 50 parts by weight of dioxane is dripped, at room temperature and while stirring, into 12.5 parts by weight of bicyclo-[3,3,0]-octylamine dissolved in 50 parts by weight of dioxane and 12 parts by weight of triethylamine. The mixture is heated to 60° C. and kept at this temperature for 1 hour. The mixture is then cooled and suction filtered, the filtrate is concentrated in vacuo and the remaining residue is recrystallized from methanol/water. The melting point of the product is 86° to 88° C.; yield: 90 percent of the theory.

Examples of amines for the production of the herbicidal active ingredients are as follows (the cyclic or polycyclic compounds on which the amines are based may be substituted by an amino or amino-methyl group on various carbon atoms of the ring system and the ring systems may have different configurations): tetracyclo-[6,2,1,1$^{3,6}$0$^{2,7}$]-dodecylamine, tricyclo-[5,2,1,0$^{2,6}$]-decylamine, bicyclo-[3,2,1]-octyl-amine, methylbicyclo-[2,2,1]-heptylamine, bicyclo-[2,2,1]-heptylamine, 1,1,3-trimethylcyclohexylamine, cyclopentylamine, cyclooctylamine, cyclododecylamine, bicyclo-[3,3,0]-octylamine, tricyclo-[6,2,1,0$^{2,7}$]-undecylamine, methyltetracyclo-[6,2,1,1$^{3,6}$0$^{2,7}$]-dodecylamine, tricyclo-[4,3,1$^{2,5}$0$^{1,6}$]-decenylamine, tetrahydrodicyclopentadienylmethyl-amine, bicyclo-[2,2,1]-heptylmethylamine, bicyclo-[2,2,2]-octyl-methyl-amine, bicyclo-[4,3,0]-nonylamine, bicyclo-[3,2,0]-heptylamine, nortricyclylamine.

Examples of the active ingredients are as follows:
2,3-dihydro-6-methyl-1,4-oxathiin-5-carboxylic acid-N-bicyclo-[3,3,0]-octylamide m.p. 86° to 88° C.
2,3-dihydro-6-methyl-1,4-oxathiin-5-carboxylic acid-N-bicyclo-[2,2,1]-heptylamide m.p. 105° to 106° C.
2,3-dihydro-6-methyl-1,4-oxathiin-5-carboxylic acid-N-methylbicyclo-[2,2,1]-heptylamide m.p. 66° to 67° C.
2,3-dihydro-6-methyl-1,4-oxathiin-5-carboxylic acid-N-tricyclo-[5,2,1,0$^{2,6}$]-decylamide m.p. 120° to 121° C.
2,3-dihydro-6-methyl-1,4-oxathiin-5-carboxylic acid-N-tetracyclo-[6,2,1,1$^{3,6}$0$^{2,7}$]-dodecylamide m.p. 132° to 133° C.
2,3-dihydro-6-methyl-1,4-oxathiin-5-carboxylic acid-N-bicyclo-[2,2,1]-heptylmethylamide m.p. 105° C.
2,3-dihydro-6-methyl-1,4-oxathiin-5-carboxylic acid-N-methylbicyclo-[2,2,1]-heptylamide m.p. 73° to 74° C.
2,3-dihydro-6-methyl-1,4-oxathiin-5Carboxylic acid-N-cyclooctylamide m.p. 85° to 88° C.
2,3-dihydro-6-methyl-1,4-oxathiin-5-carboxylic acid-N-cyclododecylamide m.p. 132° to 133° C.
2,3-dihydro-6-methyl-1,4-oxathiin-5-carboxylic acid-N-bicyclo-[3,2,1]-octylamide m.p. 86° to 87° C.

The agents for regulating plant growth according to this invention may be used as solutions, emulsions, suspensions, or dusts. The form of application depends entirely on the purpose for which the agents are being used; in any case it should ensure a fine distribution of the active ingredient.

For the preparation of solutions to be sprayed direct, the solution in water is suitable. Hydrocarbons, such as tetrahydronaphthalene, and alkylated naphthalenes may, however, also be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g., a polyethylene oxide adduct. Concentrates which are suitable for dilution with water may be prepared from active ingredient, emulsifying or dispersing agent and possible solvent.

Dusts may be prepared by mixing or grinding the active ingredients with a solid carrier, e.g., clay, talc, diatomaceous earth, fertilizer. The following experiments demonstrate the superiority of the compositions according to this invention over known active ingredients.

EXAMPLE 1

The plants rice (*Oryza sativa*), wheat (*Iriticum sativum*), Indian corn (*Zea mays*), white goosefoot (*Chenopodium album*), chickweed (*Stellaria media*), camomile (*Matricaria chamomilla*), annual meadow grass (*Poa annua*), orchard grass (*Dactylis glomerata*) and barnyard grass (*Echinochloa crus-galli*) are treated at a growth height of 3 to 15 cm. with 3 kg. per hectare of 2,3-dihydro-6-methyl-1,4-oxathiin-5-carboxylic acid-N-cyclooctylamide (I) and, for comparison, with 3 kg. per hectare of propionic acid-3,4-dichloroanilide (II), these amounts of the active ingredients each being dispersed in 500 liters of water per hectare. After 10 to 14 days it is ascertained that I has a stronger herbicidal action and more favorable compatibility with wheat and Indian corn than II.

The results of the experiment may be seen from the following table:

| | Active ingredient | |
|---|---|---|
| | I | II |
| Rice | 10 | 15 |
| Wheat | 10 | 20–30 |
| Indian corn | 0–10 | 20–30 |
| White goosefoot | 90 | 70 |
| Chickweed | 90–100 | 70 |
| Camomile | 80 | 40–50 |
| Annual meadow grass | 90 | 60 |
| Orchard grass | 90–100 | 60 |
| Barnyard grass | 90 | 70 |

0 = no damage

100 = total destruction

The following active ingredients have the same good biological action as I:

2,3-dihydro-6-methyl-1,4-oxathiin-5-carboxylic acid-N-bicyclo-[3,3,0]-octylamide
2,3-dihydro-6-methyl-1,4-oxathiin-5-carboxylic acid-N-norbornylmethyl-amide
2,3-dihydro-6-methyl-1,4-oxathiin-5-carboxylic acid-N-cyclohexylamide
2,3-dihydro-6-methyl-1,4-oxathiin-5-carboxylic acid-N-norbornylamide
2,3-dihydro-6-methyl-1,4-oxathiin-5-carboxylic acid-N-methylnorbornylamide
2,3-dihydro-6-methyl-1,4-oxathiin-5-carboxylic acid-N-3,2,1-bicyclooctylamide.

EXAMPLE 2

Loamy sandy soil is filled into pots and sown with the seeds of rice (*Oryza sativa*), Indian corn (*Zea mays*), chickweed (*Stellaria media*), camomile (*Matricaria chamomilla*), white goosefoot (*Chenopodium album*), annual meadow grass (*Poa annua*) and barnyard grass (*Echinochloa crus-galli*). The soil prepared in this manner is then treated with 4 kg. per hectare of 2,3-dihydro-6-methyl-1,4-oxathiin-5-carboxylic acid-N-bicyclo-[3,3,0]-octylamide dispersed in 500 liters of water per hectare. After 4 or 5 weeks it is ascertained that the broadleaved and grassy weeds chickweed, camomile, white goosefoot, annual meadow grass and barnyard grass are almost completely withered, whereas rice and Indian corn continue to grow undamaged.

When used at high application rates, the active ingredient may also be employed as total herbicides.

We claim:

1. A process for controlling unwanted plants which comprises applying to the situs of the plant growth, in an amount sufficient to destroy said unwanted plants, a herbicidal compound of the formula

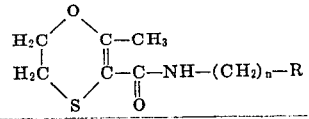

wherein $n$ denotes one of the integers 0 or 1, and R is a monocycloaliphatic, bicycloaliphatic, tricycloaliphatic or tetracycloaliphatic hydrocarbon radical of five to 15 carbon atoms but not cyclohexyl if $n$ is 0.

2. A process as claimed in claim 1 wherein $n$ is 0 and R represents cyclooctyl, norbornyl, methylnorbornyl, bicyclo-3,3,0-octyl or bicyclo-3,2,1-octyl.

3. A process as claimed in claim 1 wherein the herbicidal compound is 2,3-dihydro-6-methyl-1,4-oxathiin-5-carboxylic acid-N-cyclooctylamides.

* * * * *